3,102,908
CRYSTALLIZATION OF ADIPIC ACID IN THE PRESENCE OF POLYORGANO SILOXANE
Mitchell Raynes, Pensacola, Fla., assignor, by mesne assignments, to Monsanto Chemical Company, a corporation of Delaware
Filed Jan. 18, 1961, Ser. No. 83,440
2 Claims. (Cl. 260—537)

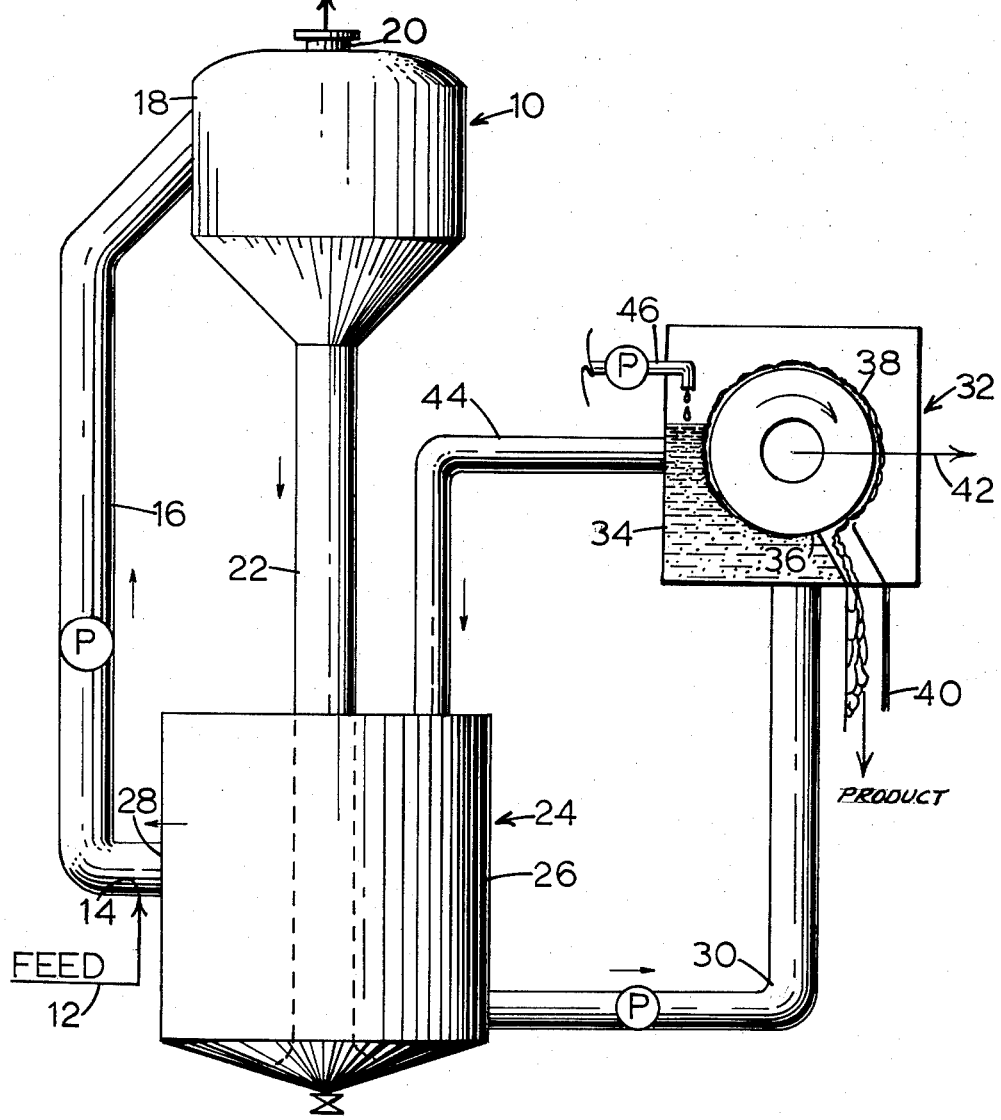

This invention relates to the production of adipic acid. More specifically, this invention relates to a process of continuous crystallization of adipic acid employing a vacuum crystallizer.

A well-known and commercial method of producing adipic acid, a valuable and widely used chemical, involves a series of steps including: (1) the oxidation of cyclohexane in the liquid phase with air or other molecular oxygen-containing gas to a mixture of cyclohexanol and cyclohexanone at rather low conversion but with a high yield; (2) the separation of the unoxidized cyclohexane from the cyclohexanol and cyclohexanone intermediate reaction product; (3) the final oxidation of the intermediate product with a strong oxidizing agent such as nitric acid into adipic acid and concomitant minor amounts of other organic dibasic acids such as glutaric acid and succinic acid; and (4) the isolation of the adipic acid from these by-product organic acids, as well as from the oxidizing agent. The presently described process has to do with the last-mentioned step, as will become apparent hereinbelow.

Separation of adipic acid from the other dibasic acids resulting from the nitric acid oxidation is accomplished on a commercial scale by crystallization thereof from the aforesaid nitric acid oxidation product and by removal of the crystallized adipic acid from the mother liquor. The crystallization of adipic acid conveniently may be carried out by the employment of an evaporative crystallization apparatus. The art has found that the crystallization of adipic acid can be conducted advantageously by the use of an "Oslo" type evaporative crystallizer designed for continuous crystallization. In the operation of such an apparatus, a nitric acid solution of adipic acid is introduced to the evaporative crystallizer in such a manner that the solution passes first through an evaporation zone where some of the nitric acid and water flash. In the zone a predetermined amount of evaporation and cooling occur to develop a predetermined supersolubility of the adipic acid. The supersaturated solution of adipic acid next is passed through a crystallization zone wherein crystals of adipic acid grow to within a suitable size range. When the crystals have reached the desired size, the crystals are continuously withdrawn from the crystallization zone in the form of a crystal magma which comprises a mixture of solid adipic acid and mother liquor. The thus withdrawn magma is then passed to suitable separation equipment such as a rotary vacuum filter used to recover the crystallized adipic acid.

Certain problems have arisen in connection with the employment of the aforedescribed type of crystallization for producing adipic acid. One vexatious problem is the build-up of adipic acid crystals on the inner walls of the apparatus in the crystallization zone, as well as in the withdrawal lines between the crystallization zone and the separation equipment. Although the crystallization apparatus is designed for continuous operation, occasional cessation of operation thereof is required because of the build-up of adipic acid deposits in the equipment.

A second problem connected with the aforementioned type of crystallization is due to frothing and foaming of the material undergoing evaporation. In many instances the material is so spumous that some of the material might pass overhead to the condensing and vacuum producing equipment, thereby resulting in loss of some of the valuable adipic acid.

An object of this invention, therefore, is to provide an improved process of crystallization.

Another object of this invention is to provide an improved process for the continuous vacuum crystallization of adipic acid, whereby build-up of adipic acid crystals on the inner surfaces of the crystallizer is minimized.

A still further object is to provide an improved process of continuously crystallizing adipic acid employing a vacuum crystallizer, whereby build-up of adipic acid crystals on the inner surfaces of the crystallizer and foaming of the adipic acid solution are prevented or minimized.

Other objects of this invention will be apparent from the accompanying description and drawing.

In general, the objects of this invention are accomplished by continuously maintaining a small amount of liquid polyorgano siloxane in the crystallizer during the crystallization of adipic acid from an aqueous solution. In accordance with this improved method of crystallizing adipic acid, it has been discovered that the presence of a siloxane of the aforementioned class reduces materially the build-up of adipic acid crystals in the crystallizer and that foaming of the material undergoing evaporation also is considerably reduced.

More specifically, and in accordance with a preferred practice of the invention, it has been found that the process of continuous vacuum crystallization of adipic acid wherein supersaturation of aqueous nitric acid solution containing adipic acid dissolved therein is induced by pressure reduction, is notably improved by the continuous addition of a small amount of liquid polyorgano siloxane to the adipic acid magma resulting from the vacuum crystallization, whereby deposit build-up of adipic acid crystals on the inner walls of the crystallizer and foaming in the vacuum zone in the crystallizer are minimized.

In the method of the invention a stream of aqueous nitric acid solution containing adipic acid dissolved therein is flowed through a vacuum zone in a vacuum crystallizer. The solution may be the reaction product of the conventional nitric acid oxidation of cyclohexanol and/or cyclohexanone into certain organic dibasic acids, the main constituent of which is adipic acid. The crystallizer may be of the type commonly referred to as an "Oslo" crystallizer. In the vacuum zone the adipic acid-containing solution is flashed to equilibrium temperature. Also within the zone a predetermined amount of evaporation and cooling occurs so that a predetermined super-solubility of the adipic acid comes to pass. The resulting supersaturated solution is continuously withdrawn from the evaporation zone and is flowed to a crystallization zone wherein crystals of adipic acid form. The magma resulting in the crystallization zone is withdrawn therefrom at a rate substantially equal to the rate at which the aqueous nitric acid solution containing adipic acid is brought into the system as feed material. The withdrawn magma is continuously fed to a separation zone where a portion of the adipic acid crystals and mother liquor is withdrawn by means of a filtration operation or other separation procedure. The remaining magma is recycled continuously to the crystallization zone. A small amount of liquid polyorgano siloxane in emulsion form is continuously added to the magma just prior to the recycling thereof.

The useful siloxanes may be represented by the following general formula:

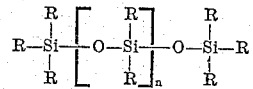

wherein R represents the same or different hydrocarbon radicals such as alkyl, aryl, alkylaryl and aralkyl radicals and $n$ is a number greater than 1 and up to 9 or more. Preferably R is a lower saturated aliphatic radical such as methyl, ethyl, etc. Mixtures wherein the components have different chain lengths are suitable. The orientation and nature of the hydrocarbon substituents are not of critical importance provided that the siloxane chain is of sufficient length to be liquid and not cross-linked to such an extent to be a solid. The liquid siloxanes should have a boiling point sufficiently high to avoid being flashed off in the evaporation zone. The polyalkylsiloxanes such as polydimethylsiloxanes with viscosities between 50 and 1000 centistokes as measured at 25° C. are particularly useful. Such materials can be purchased from the Dow Corning Corporation of Midland, Michigan, and from the General Electric Company of Pittsfield, Massachusetts. Since the just mentioned siloxanes are per se immiscible in water, they are added to the crystallizer in an emulsion form. Fluids of various viscosities and compositions are found in the commercially available emulsions. Such emulsions normally have about 35–50 percent polyorgano siloxane, the remainder of which is composed of water and a small amount of a suitable emulsifying agent. Some commercial preparations may contain a rust inhibitor. The siloxane emulsions are white and creamy in appearance, and relatively stable on storage. The emulsions can be diluted with water with ease, and the diluted emulsions are stable under the conditions employed. Before adding the siloxane to the crystallizer it is preferred to dilute the emulsion thereof considerably, for example, 10 parts or more of water to 1 part of emulsion, to facilitate material handling. The amount of polyorgano siloxane maintained in the crystallizer may vary within reasonably wide limits. the amount required may be as low as about 0.1 p.p.m., but an amount of 10 p.p.m. and higher is usually sufficient to provide a factor of safety.

It is important with respect to one aspect of the present invention that the polyorgano siloxane be added to the crystallizer continuously rather than by batchwise addition. It has been found that batchwise addition of the polyorgano siloxanes does not minimize the foaming or deposit build-up of adipic acid crystals but merely suppresses these conditions once they start.

It is quite surprising that the addition of the liquid polyorgano siloxanes of the above-defined class in the form dissolvable in the aqueous nitric acid solution containing adipic acid dissolved therein minimizes foaming in the evaporation zone. It is well recognized that each foaming problem is different and usually requires an empirical solution. Generally speaking, most antifoam agents are poorly soluble in the medium in which it is effective. Since the aqueous emulsion added to the crystallizer is dissolvable in the liquid therein, one reasonably would not expect the foaming to be minimized.

The place of addition of the liquid polyorgano siloxane to the crystallizer is not of critical importance as long as a sufficient amount is present in the evaporation zone to minimize foaming in the crystallization zone and to minimize build-up of crystal deposits on the walls of the crystallizer and in connecting conduits. However, it is preferred that the siloxane be added continuously to the magma being recycled from the separation zone to the crystallization zone.

Reference is now made to the attached drawing which represents one embodiment of the invention, parts of the apparatus being shown in elevation and other parts being shown diagrammatically.

Numeral 10 represents generally an evaporation zone wherein water and nitric acid are removed so as to supersaturate the liquor therein. Entry of the feed material containing adipic acid dissolved therein is provided by means of feed line 12. The feed material enters at 14 and combines with a recycle stream flowing upwardly through conduit 16 as indicated by the arrows. The combined stream is propelled upwardly through this conduit by means of a pump and discharged into a flash vessel 18. At the top of the vessel there is an outlet conduit 20 which, as indicated, eventually connects with condensing and vacuum producing equipment. A certain amount of cooling and evaporation results from the flashing, which induces in the solution a definite supersolubility. Supersaturated solution passes through pipe 22 and discharges into the crystallization zone 24. In crystal suspension tank 26 crystals of adipic acid form, and the flow of liquor in tank 26 performs a classifying action. Mother liquor is withdrawn from the tank at 28 and is recycled to the evaporation zone via conduit 16.

Magma is withdrawn from the bottom of tank 26 and conveyed by means of a pump in line 30 to a separation zone 32. Inside filter slurry tank 34 there is shown a rotary vacuum filter 36. The mother liquor in the magma is withdrawn interiorly of the filter, with a filter cake 38 being formed on the periphery of the filter. This cake is removed from the filter and is discharged through chute 40 for further processing, if desired. The mother liquor filtrate leaves the separation zone via line 42 for further processing, if desired. The depleted magma in the upper liquid area in tank 34 is recycled through conduit 44 to the crystallization zone. A diluted emulsion of polyorgano siloxane is pumped or metered at a predetermined rate from an emulsion reservoir (not shown) through a pipe 46. This emulsion enters the system just above the point where the magma is recycled through conduit 44. Thus, a predetermined amount of the siloxane is maintained in the evaporation zone and in the crystallization zone during operation.

The following example illustrates one method of carrying out the invention. However, it is given merely by way of illustration and not by way of limitation.

*Example*

An "Oslo" continuous vacuum crystallizer, of the type illustrated in the accompanying drawing, was employed to crystallize adipic acid from the nitric acid solution of the product of a mixture of cyclohexanol and cyclohexanone oxidized with nitric acid by a conventional procedure. The crystallizer was operated under steady-state conditions. A water dispersible siloxane obtainable in the trade under the name, "Dow Corning 36 Emulsion" was diluted. The emulsion before dilution contained 35 percent of liquid polydimethylsiloxane, a small amount of a dispersing agent, a small amount of sodium nitrite as a rust inhibitor and water as the thinner. Dilution was made with approximately 16 parts water to one part emulsion. The diluted emulsion was metered continuously to tank 34 to provide about 0.5 p.p.m. siloxane in the material contained in the evaporation zone and in the crystallization zone. It was observed that no excessive foaming occurred thereafter and that build-up of adipic acid crystals in the crystallizer was notably reduced.

In a control run made under identical conditions but with the addition of the siloxane being made batchwise when excessive foaming was noticed in the evaporation zone, excessive foaming was not prevented but only was suppressed once it started. Also, there was no noteworthy reduction of adipic acid deposits in the crystallizer.

From the above description it is seen that many advantages are afforded by the practice of the invention. One such advantage is that foaming in the crystallization zone is minimized. This means that a more efficient evaporation of the feed material can be obtained without fear of froth being carried over to the condensing equipment. In addition, a considerably longer period of time before shutdown of the crystallizer to remove adipic acid deposits in the conduits and in the crystallization tank is provided. Other advantages may be noted.

It is understood that various changes of the instant process may be made without departing from the spirit of the disclosure and that the invention is only limited to the scope of the following claims.

What is claimed is:

1. In the process of continuously crystallizing adipic acid from the reaction product resulting from nitric acid oxidation of a mixture of cyclohexanol and cyclohexanone produced by liquid phase oxidation of cyclohexane, the steps comprising:
(a) flowing a stream of said reaction product into a vacuum zone wherein evaporation and cooling thereof occur to develop supersaturation of the adipic acid;
(b) flowing the resulting supersaturated solution to a crystallization zone wherein crystals of adipic acid form;
(c) recycling a portion of said solution to the vacuum zone;
(d) withdrawing resulting magma containing adipic acid crystals from the crystallization zone;
(e) filtering and removing a portion of the adipic acid crystals and a portion of the mother liquor from the withdrawn magma;
(f) recycling the magma from which said portions of adipic acid and mother liquor have been removed to the crystallization zone; and
(g) continuously adding an aqueous emulsion of a liquid polyorgano siloxane in an amount sufficient to maintain about 0.1–10 p.p.m. of the siloxane in the vacuum and crystallization zones, said aqueous emulsion being dissolvable in said magma, and said siloxane having the general formula:

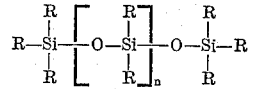

wherein R is a lower alkyl radical and $n$ is a number greater than 1 and up to about 9.

2. The process of claim 1 wherein the liquid polyorgano siloxane is polydimethylsiloxane having a viscosity of 50 to 1000 centistokes as measured at 25° C.

References Cited in the file of this patent
UNITED STATES PATENTS

| | | |
|---|---|---|
| 2,813,122 | Clarke et al. | Nov. 12, 1957 |
| 2,990,419 | Nitzsche et al. | June 27, 1961 |

OTHER REFERENCES

Schwartz et al.: "Surface Active Agents and Detergents" (1958), vol. II, pages 200 and 726–729. (Copy in Scientific Library.)